United States Patent
Ryan et al.

(10) Patent No.: US 11,429,101 B2
(45) Date of Patent: Aug. 30, 2022

(54) ADAPTIVE AUTONOMY SYSTEM ARCHITECTURE

(71) Applicant: Aurora Flight Sciences Corporation, Manassas, VA (US)

(72) Inventors: Jason Ryan, Manassas, VA (US); Jeffery Saunders, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 141 days.

(21) Appl. No.: 15/957,003

(22) Filed: Apr. 19, 2018

(65) Prior Publication Data
US 2019/0324456 A1    Oct. 24, 2019

(51) Int. Cl.
| | |
|---|---|
| *B64C 39/02* | (2006.01) |
| *G08G 5/00* | (2006.01) |
| *G08G 5/02* | (2006.01) |
| *G05D 1/00* | (2006.01) |
| *G05B 19/42* | (2006.01) |

(Continued)

(52) U.S. Cl.
CPC .......... *G05D 1/0088* (2013.01); *B64C 13/18* (2013.01); *B64C 39/024* (2013.01); *B64D 31/06* (2013.01); *G05B 19/042* (2013.01); *G05D 1/0016* (2013.01); *G05D 1/101* (2013.01); *B64C 2201/021* (2013.01); *B64C 2201/024* (2013.01); *B64C 2201/141* (2013.01); *B64C 2201/146* (2013.01); *G05B 2219/25347* (2013.01)

(58) Field of Classification Search
None
See application file for complete search history.

(56) References Cited

U.S. PATENT DOCUMENTS

| | | |
|---|---|---|
| 8,038,062 B2 | 10/2011 | Kenefic |
| 8,437,890 B2 | 5/2013 | Anderson et al. |

(Continued)

OTHER PUBLICATIONS

Extended European search report for EU application No. 19170383.4, dated Sep. 23, 2019.

(Continued)

*Primary Examiner* — Adam D Tissot
*Assistant Examiner* — Laura E Linhardt
(74) *Attorney, Agent, or Firm* — Michael Stanley Tomsa; McAndrews, Held & Malloy, Ltd.; Amanda C. Jackson

(57) ABSTRACT

An autonomy system for use with a vehicle in an environment. The autonomy system comprising a processor operatively coupled with a memory device, a plurality of sensors operatively coupled with the processor; a vehicle controller, a situational awareness module, a task planning module, and a task execution module. The situational awareness module being configured to determine a state of the environment based at least in part on sensor data from at least one of the plurality of sensors. The task planning module being configured to identify, via the processor, a plurality of tasks to be performed by the vehicle and to generate a task assignment list from the plurality of tasks that is based at least in part on predetermined optimization criteria. The task execution module being configured to instruct the vehicle controller to execute the plurality of tasks in accordance with the task assignment list. The task execution module may be configured to monitor the vehicle or the vehicle controller during execution of the task assignment list to identify any errors.

23 Claims, 7 Drawing Sheets

(51) Int. Cl.
  *B64C 13/18* (2006.01)
  *B64D 31/06* (2006.01)
  *G05B 19/042* (2006.01)
  *G05D 1/10* (2006.01)

(56) References Cited

U.S. PATENT DOCUMENTS

| | | | |
|---|---|---|---|
| 9,262,929 | B1 | 2/2016 | Roy et al. |
| 9,557,742 | B2 | 1/2017 | Paduano et al. |
| 2004/0030449 | A1* | 2/2004 | Solomon ............ H04B 7/18517 700/245 |
| 2010/0145556 | A1* | 6/2010 | Christenson .............. G06F 8/36 701/15 |
| 2014/0025228 | A1 | 1/2014 | Jang et al. |
| 2014/0074339 | A1* | 3/2014 | Casado ................. G05D 1/104 701/24 |
| 2015/0100194 | A1 | 4/2015 | Terada |
| 2017/0168485 | A1 | 6/2017 | Berntorp et al. |
| 2017/0193830 | A1 | 7/2017 | Fragoso et al. |
| 2018/0074499 | A1* | 3/2018 | Cantrell ............... G05D 1/0088 |
| 2018/0357909 | A1* | 12/2018 | Eyhorn ................ G08G 5/0013 |

OTHER PUBLICATIONS

Dubins, L.E. (Jul. 1957). "On Curves of Minimal Length with a Constraint on Average Curvature, and with Prescribed Initial and Terminal Positions and Tangents," American Journal of Mathematics. 79 (3): 497-516.

Satyanarayana G. Manyam, Sivakumar Rathinam, David Casbeer, Eloy Garcia, "Shortest Paths of Bounded Curvature for the Dubins Interval Problem," https://www.researchgate.net/publication/280497994, Jul. 2015.

Sertac Karaman ,Emilio Frazzoli, "Incremental Sampling-based Algorithms for Optimal Motion Planning", arXiv:1005.0416v1, May 3, 2010.

Examination report for EU application No. 19170383.4, dated Jul. 28, 2020 (7 pages).

Examination report for EU application No. 19170383.4, dated Dec. 23, 2020 (6 pages).

Summons to attend oral proceedings pursuant to Rule 115(1) EPC for EU application No. 19170383.4, dated May 18, 2021 (10 pages).

* cited by examiner

ADAPTIVE AUTONOMY SYSTEM ARCHITECTURE

FIELD

The present disclosure relates to autonomy systems for vehicles and other systems.

BACKGROUND

The use of Unmanned Aerial vehicles (UAVs) and Unmanned Aerial Systems (UASs) has grown in recent years and such UAVs and SUASs are employed in a wide variety of applications, including both military and civilian uses. Research is continually being performed to improve UAS autonomy. Often, such research endeavors to address multiple aspects of UAV/UAS operation, including inter alia (1) automatic flight control of a given vehicle to support remote human control, (2) optimization systems (and associated methods) to determine how, for a given vehicle or set of vehicles, tasks should be ordered and/or allocated, and (3) automatic, real-time data processing, and exploitation in support of automatic path planning, landing, and other activities.

Despite the advancements, existing autonomy systems are typically configured to address only one aspect of these activities, thereby focusing its design of the underling autonomy algorithms and software architecture on a narrow mission set. As can be appreciated, this limits the extensibility of existing autonomy systems, as they are not well-equipped to support the addition of new modules to the autonomy system. Furthermore, existing autonomy systems may or may not be structured for rapid adaptation to new platforms through parameterization. Therefore, a need exists for improved autonomy systems for vehicles and other systems.

SUMMARY OF THE DISCLOSURE

The present disclosure is directed to autonomy systems for vehicles and other systems.

According to a first aspect, an autonomy system for use with a vehicle in an environment comprises: a processor operatively coupled with a memory device; a plurality of sensors operatively coupled with the processor; a vehicle controller; a situational awareness module operatively coupled to the plurality of sensors, wherein the situational awareness module is configured to determine a state of the environment based at least in part on sensor data from at least one of the plurality of sensors; a task planning module communicatively coupled with the situational awareness module, wherein the task planning module is configured to identify, via the processor, a plurality of tasks to be performed by the vehicle, wherein the task planning module is configured to generate, via the processor, a task assignment list from the plurality of tasks that is based at least in part on predetermined optimization criteria; and a task execution module operatively coupled with the vehicle controller, wherein the task execution module is configured to instruct the vehicle controller to execute the plurality of tasks in accordance with the task assignment list, wherein the task execution module is configured to monitor the vehicle or the vehicle controller during execution of the task assignment list to identify any errors.

In certain aspects, the vehicle is an aircraft and the vehicle controller is a flight controller, wherein flight controller is configured to control one or more thrust generators or one or more actuators in accordance with the task assignment list.

In certain aspects, the autonomy system further comprises a task consensus module to analyze the task assignment list of the vehicle vis-à-vis a second task assignment list associated with a second vehicle that is equipped with an autonomy system, wherein the second task assignment list comprises a second plurality of tasks and wherein the task consensus module is configured to adjust the task assignment list based at least in part on the second task assignment list.

In certain aspects, the task consensus module is configured to adjust the task assignment list based at least in part on the second task assignment list to maximize overall efficiency of the vehicle and the second vehicle in performing a collaborative objective.

In certain aspects, the task consensus module is configured to reallocate tasks between the task assignment list and the second task assignment list.

In certain aspects, the predetermined optimization criteria is updated based at least in part on results from execution of the task assignment list.

In certain aspects, the task consensus module is configured to reassign at least one of said plurality of tasks from the task assignment list to the second task assignment list.

In certain aspects, the task consensus module is configured to reassign at least one of said plurality of tasks from the second task assignment list to the task assignment list.

In certain aspects, the task consensus module is configured to reorder said plurality of tasks based at least in part on the second task assignment list or the task assignment list.

In certain aspects, the task consensus module is configured to reorder said second plurality of tasks based at least in part on the task assignment list.

In certain aspects, the plurality of tasks and the second plurality of tasks overlap at least in part.

In certain aspects, overlapping tasks are removed from either the task assignment list or the second task assignment list.

In certain aspects, the autonomy system further comprises a human-machine interface to provide a communication interface between the autonomy system and a user.

In certain aspects, the human-machine interface is operatively coupled with each of the situational awareness module, the task planning module, and the task execution module.

In certain aspects, the human-machine interface enables a user to modify the task assignment list.

In certain aspects, the vehicle controller is configured to navigate the vehicle based at least in part on the task assignment list.

In certain aspects, the task assignment list is configured to instruct the vehicle to travel from a first location to a second location, perform an operation at the second location, and return to the first location from the second location upon completion of the operation.

In certain aspects, the operation is an intelligence, surveillance, and reconnaissance (ISR) operation.

In certain aspects, the memory device comprises an interchangeable library of code to provide autonomy, regardless of vehicle type.

According to a second aspect, a method of operating a vehicle having an autonomy system in an environment comprises: determining a state of the environment based at least in part on sensor data from at least one of a plurality of sensors coupled to the vehicle; identifying, via a processor, a plurality of tasks to be performed by the vehicle; generating, via the processor, a task assignment list from the plurality of tasks that is based at least in part on predetermined optimization criteria; instructing a vehicle controller of the vehicle to execute the plurality of tasks in accordance with the task assignment list; and monitoring the vehicle or the vehicle controller during execution of the task assignment list to identify any errors.

In certain aspects, the vehicle is an aircraft and the vehicle controller is a flight controller, wherein flight controller is configured to control one or more thrust generators or one or more actuators in accordance with the task assignment list.

In certain aspects, the method further comprises the steps of: analyzing the task assignment list of the vehicle vis-à-vis a second task assignment list associated with a second vehicle that is equipped with an autonomy system, wherein the second task assignment list comprises a second plurality of tasks; and adjusting the task assignment list based at least in part on a second task assignment list.

In certain aspects, the method further comprises the step of adjusting the task assignment list based at least in part on the second task assignment list to maximize overall efficiency of the vehicle and the second vehicle in performing a collaborative objective.

In certain aspects, the step of adjusting comprises reallocating tasks between the task assignment list and the second task assignment list.

In certain aspects, the step of adjusting comprises reassigning at least one of said plurality of tasks from the task assignment list to the second task assignment list.

In certain aspects, the step of adjusting comprises reassigning at least one of said plurality of tasks from the second task assignment list to the task assignment list.

In certain aspects, the step of adjusting comprises reordering said plurality of tasks based at least in part on the second task assignment list.

In certain aspects, the step of adjusting comprises reordering said second plurality of tasks based at least in part on the task assignment list.

In certain aspects, the plurality of tasks and the second plurality of tasks overlap at least in part.

In certain aspects, comprising the step of removing any overlapping tasks from either the task assignment list or the second task assignment list.

In certain aspects, the processor is operatively coupled with a human-machine interface to provide a control and communication interface between the autonomy system and a user.

In certain aspects, the method further comprises the step of modifying the task assignment list based at least in part on an input from a user via a human-machine interface.

In certain aspects, the vehicle controller is configured to navigate the vehicle based at least in part on the task assignment list.

In certain aspects, the task assignment list is configured to instruct the vehicle to travel from a first location to a second location, perform an operation at the second location, and return to the first location from the second location upon completion of the operation.

In certain aspects, the operation is an intelligence, surveillance, and reconnaissance (ISR) operation.

In certain aspects, the processor is operatively coupled with a memory device comprising an interchangeable library of code configured to provide autonomy, regardless of vehicle type.

According to a third aspect, an autonomous aircraft for operation in an environment comprises: a processor operatively coupled with a memory device; a plurality of sensors operatively coupled with the processor; a flight controller; a situational awareness module operatively coupled to the plurality of sensors, wherein the situational awareness module is configured to determine a state of the environment based at least in part on sensor data from at least one of the plurality of sensors; a task planning module communicatively coupled with the situational awareness module, wherein the task planning module is configured to identify, via the processor, a plurality of tasks to be performed by the vehicle, wherein the task planning module is configured to generate, via the processor, a task assignment list from the plurality of tasks that is based at least in part on predetermined optimization criteria; and a task execution module operatively coupled with the flight controller, wherein the task execution module is configured to instruct the flight controller to execute the plurality of tasks in accordance with the task assignment list, wherein the task execution module is configured to monitor the flight controller during execution of the task assignment list to identify any errors.

In certain aspects, upon executing the task assignment list, the autonomous aircraft to travel from a first location to a second location, perform an operation at the second location, and return to the first location from the second location upon completion of the operation.

In certain aspects, the operation is an intelligence, surveillance, and reconnaissance (ISR) operation.

In certain aspects, the autonomous aircraft further comprises a task consensus module to analyze the task assignment list of the autonomous aircraft vis-à-vis a second task assignment list associated with a second autonomous aircraft that is equipped with an autonomy system, wherein the second task assignment list comprises a second plurality of tasks and wherein the task consensus module is configured to adjust the task assignment list based at least in part on the second task assignment list.

In certain aspects, the task consensus module is configured to adjust the task assignment list based at least in part on the second task assignment list to maximize overall efficiency of the autonomous aircraft and the second autonomous aircraft in performing a collaborative objective.

In certain aspects, the task consensus module is configured to reallocate tasks dynamically between the task assignment list and the second task assignment list.

In certain aspects, the task planning module is configured to prioritize a task as a function of its likelihood to affect the autonomous aircraft's mission.

DRAWINGS

These and other advantages of the present disclosure may be readily understood with the reference to the following specifications and attached drawings wherein.

DESCRIPTION

Figure 1A:
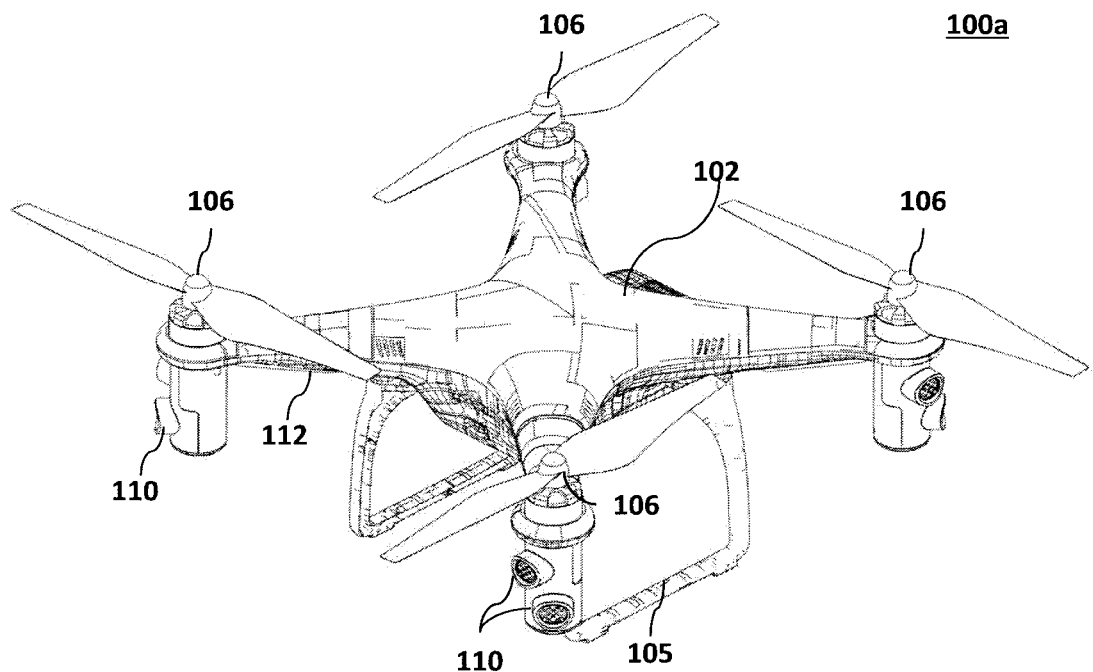
FIGS. 1a and 1b illustrate, respectively, views of an example multirotor aircraft and an example fixed-wing aircraft.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front,", "frontal", "back," and the like, are words of convenience and are not to be construed as limiting terms. The various data values (e.g., distances, seconds, etc.) provided herein may be substituted with one or more other predetermined data values and, therefore, should not be viewed limiting, but rather, exemplary. For this disclosure, the following terms and definitions shall apply:

The terms "aerial vehicle" and "aircraft" refer to a machine capable of flight, including, but not limited to, fixed wing aircraft, unmanned aerial vehicle, optionally-piloted aircraft, variable wing aircraft, and vertical take-off and landing (VTOL) aircraft.

The term "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is an Adaptable Autonomy Architecture (A3) system and method configured to, inter alia, facilitate use of an extensible software framework that supports the definition of generic, parameterized autonomy algorithms that reside within a set of standardized modules. The disclosed A3 system maximizes extensibility of the architecture across not only aircraft, but also ground, sea, and surface vehicles, in addition to autonomous agents acting in cyberspace, for example. The A3 system can provide a single architecture that can house a library of parameterized functions or algorithms that are tailored for different vehicles (or mission applications) and a reconfigurable design that employs only the necessary algorithms and modules, while also enabling rapid activation or deactivation of algorithms as required. An objective of the A3 system is to support enhanced UAS capabilities by providing an autonomy system that minimizes the amount of effort required to extend the A3 system implementation from one vehicle or mission to another—all software development is applicable to all systems for which A3 is installed.

An advantage of the A3 system over prior systems is that the A3 system is architected with an interchangeable library of code aimed to provide autonomy system, regardless of domain or vehicle. For example, the A3 system's interface control documents can be defined as a standardized system with its modules entirely parameterized, thereby ensuring the ability to extend code rapidly from one system to another. The A3 system can also be designed to handle the absence of any module without material failure/issue. Prior autonomy systems, conversely, are often not written in a completely parameterized and independent fashion; therefore, they are unable to handle the absence of a module automatically. Moreover, prior autonomy systems are domain-specific and would require significant redevelopment in order to adapt those systems for other domains or vehicles (e.g., aircraft, surface (water) vehicles, ground vehicles, or cyber systems). For example, prior autonomy systems designed for an aircraft could not be readily ported to an automobile. The modularity and parameterization of the A3 system's contents ensure that the A3 system can be immediately extensible to a new system without rework. In addition, the A3 system's architecture also provides a more comprehensive set of modules aimed at supporting autonomous operations beyond those of known architectures.

Figure 1B:
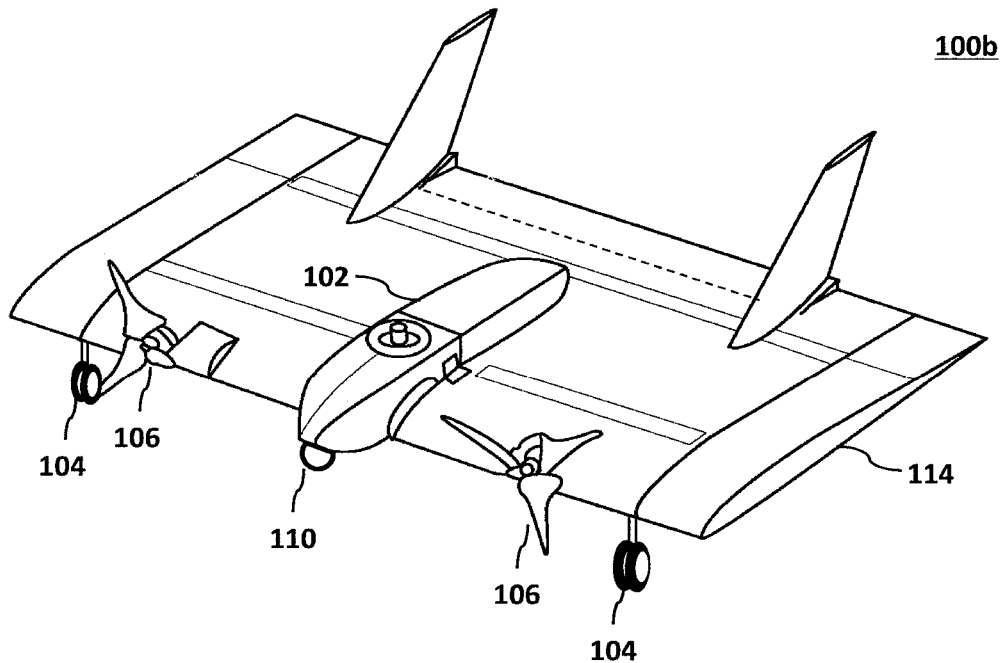

FIGS. 1a and 1b illustrate perspective views of example aerial vehicles 100 for use with an A3 system (also referred to as "autonomy system"), namely a multirotor aerial vehicle 100a and a fixed-wing aerial vehicle 100b. More specifically, FIG. 1a illustrates an exemplary autonomous multirotor aerial vehicle 100a (illustrated as a quadcopter) capable of vertical take-off and landing, while FIG. 1b illustrates a fixed wing aircraft 100b. In either case, the aerial vehicles 100 may comprise an airframe 102 (e.g., a fuselage or chassis), landing gear 104, a flight control system 120 (better illustrated in FIG. 1c), and one or more thrust generators 106 to provide lift or thrust (e.g., a turbine, a motor 108 or engine 118 operatively coupled with a propeller, etc.). The flight control system 120 may be housed at least in part within an electronics module, which can be integrated with the airframe 102, provided via a separate housing or pod, or a combination thereof. In the case of the multirotor aerial vehicle 100a, the thrust generators 106 may be coupled to the airframe 102 via a plurality of rotor booms 112. In the case of the fixed wing aircraft 100b, one or more fixed wings 114 may be coupled to the airframe 102. While the one or more fixed wings 114 may be distinct from the airframe 102, the fixed wing aircraft 100b may instead be configured as a blended-wing or flying-wing configuration.

Regardless of configuration, the aerial vehicle 100 may comprise one or more sensors 110 (e.g., as part of an intelligence, surveillance, and reconnaissance (ISR) payload 140 or separately therefrom), such as echolocation sensors, which generally function by emitting a sound frequency into an environment and detecting any echoes of the sound frequency that return from obstacles near the echolocation sensors. Using the strength of the echo and/or direction of echo's return, the echoes may be used to locate and/or identify obstacles, which in turn may cause the aerial vehicle to change direction so as to avoid collision with one or more obstacles. The sensors 110, however, are not limited to echolocation sensors and may include, inter alia, any vision-based sensor, laser-based sensor, radar-based sensor, or acoustic sensor known in the art or that will become known in the art, including, without limitation, cameras, radar, LIDAR, and the like. In one aspect, cameras may be used to identify larger objects through three-dimensional reconstruction techniques such as optical flow. While this may provide useful information for autonomous navigation, the processing latency associated with optical imaging, as well as the sensitivity to the visibility of various types of objects, may limit the utility of optical sensing techniques for detecting small, rapidly approaching objects in a line of flight of a vehicle. Therefore, echolocation may be used to supplement vision sensing systems.

One or more of the sensors 110 may be off-board sensors and configured to relay information from a remote location to the aerial vehicle 100. Therefore, the sensors 110 may be onboard (e.g., coupled to the aerial vehicle 100), off-board (e.g., ground-based or positioned aboard another aerial vehicle), or a combination thereof. In a ground-based sensor arrangement, for example, a ground-based object detection system (e.g., radar on the ground, a ground vehicle, or ship) may communicate ground-based sensor data to the aerial vehicle 100. In a multi-vehicle communication system, for example, multiple aerial vehicles may cooperate with one another, effectively forming a mesh network to share sensor data. Multiple sensor data from various sources and/or types may be fused together to create a unified sensor data, such that the aerial vehicle(s) operate based on the common unified sensor data. In such multi-vehicle communication systems, each aerial vehicle 100 may be provided with one or more on-board sensors that, together with the onboard sensors of the other aerial vehicles, collaborate to assess the sensed environment. The multi-vehicle communication systems can facilitate operation of aerial vehicle swarms (e.g., a group of aerial vehicles, sometimes including hundreds or thousands of aerial vehicles). Sensor data from the various sensors 110, including the onboard and/or off-board sensors, can be fused via a track management system. For example, sensor fusion can process data from multiple sensor sources or types, create a unified sensor data", and communicate with other vehicles (e.g., other aerial vehicles) when necessary, to merge track data into a single unified common operating environment.

The sensors 110 may be positioned to obtain a field of view in the aerial vehicle's direction of travel, thereby identifying potential obstacles in the aerial vehicle 100's path. For example, a single sensor 110 (or single group of sensors 110) may be provided at the front of the aerial vehicle 100 to detect a threat of collision (e.g., obstructions or obstacles) in the path of the aerial vehicle 100. By orienting the sensors 110 toward the line of flight, acoustic detection may supplement optical detection and be used for detecting immediate obstructions that should trigger the execution of responsive maneuvers by a vehicle. Moreover, as demonstrated by the autonomous multirotor aerial vehicle 100a, a plurality of sensors 110 (or multiple groups of sensors) may be positioned around the perimeter (and/or top and bottom) of the aerial vehicle 100 to provide a field of view that is oriented with the aerial vehicle 100's line of flight. Accordingly, the plurality of sensors 110 would enable the aerial vehicle 100 to detect a threat of collision on any side of the aerial vehicle 100, effectively providing a 360 degree field of view around the aerial vehicle 100.

It will be appreciated that an objective of the acoustic sensors is to provide immediate detection of obstacles directly in a flight path (or other line of travel), particularly obstacles that might not be detected using visual detection or other techniques. Correspondingly, it should be appreciated that an objective of the sensors 110 is to provide immediate detection of obstacles in a specific direction (e.g., any direction of the aerial vehicle), particularly obstacles that might not be readily detected using visual detection or other techniques. While an echolocation array operates well, other sensor systems may also, or instead, be suitably employed for rapid, accurate detection of obstacles, such as laser-based techniques or any other suitable techniques using optical, acoustic, radio frequency, or other sensing modalities. Any such technique suitable for implementation in an autonomous vehicle and capable of accurately and quickly identifying obstructions may be used in lieu of (or to supplement) the echolocation sensors in the systems and methods contemplated herein. For example, the autonomy system may employ a combination of vision- and acoustic-based sensors.

Figure 1C:
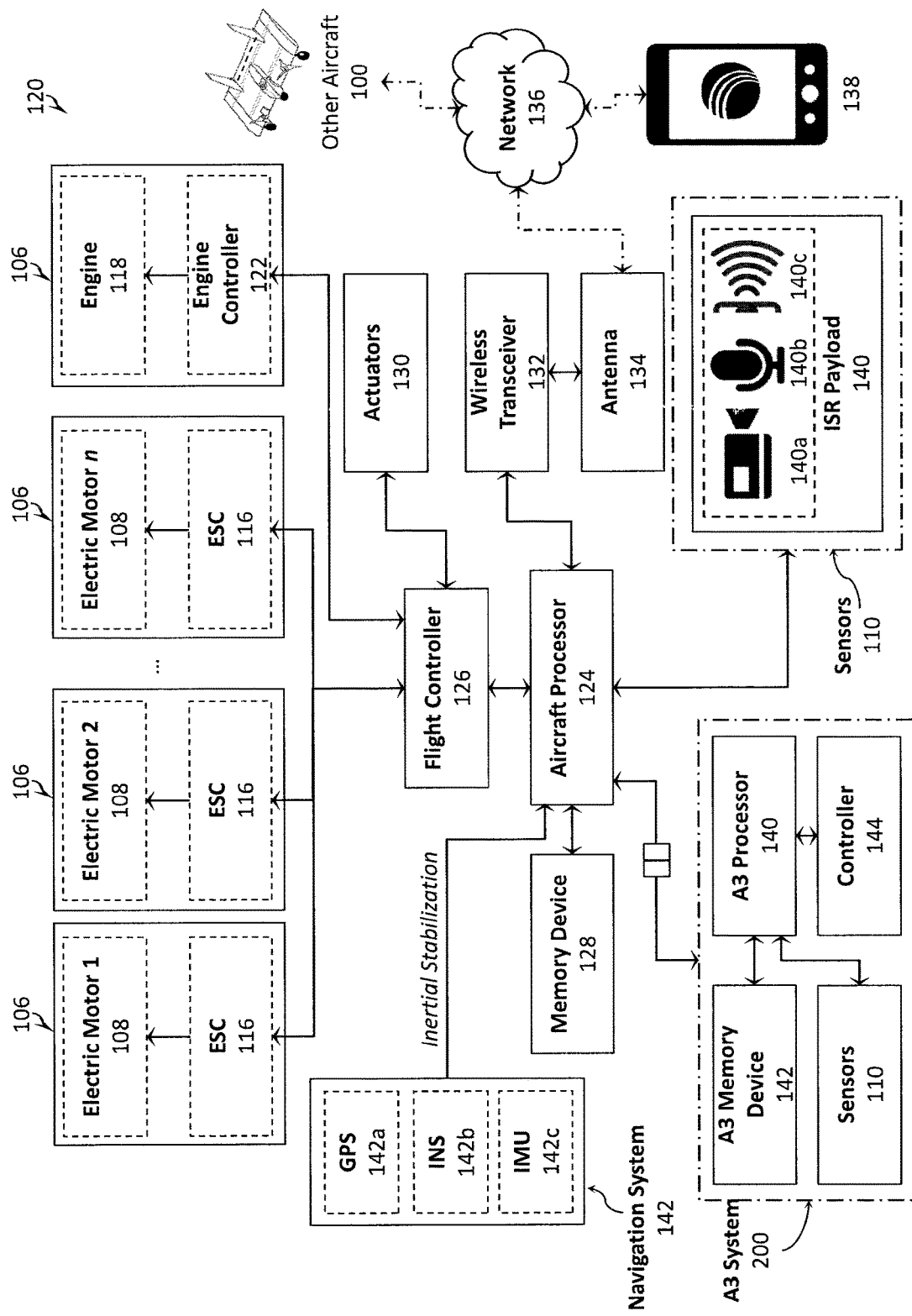
FIG. 1c illustrates a block diagram of an example flight control system for the aircraft of FIGS. 1a and/or 1b.

FIG. 1c illustrates a block diagram of an example flight control system 120 for the aerial vehicle 100. The flight control system 120 may be configured to control the various components and functions of the aerial vehicle 100. As illustrated, the flight control system 120 includes one or more aircraft processors 124 communicatively coupled with at least one memory device 128, a flight controller 126, a wireless transceiver 130, and a navigation system 142. The aircraft processor 124 may be configured to perform one or more operations based at least in part on instructions (e.g., software) and one or more databases stored to the memory device 128 (e.g., hard drive, flash memory, or the like). The aircraft control system may further include other desired services, such as a wireless transceiver 130 coupled with an antenna 132 to communicate data between the flight control system 120 and a remote device 138 (e.g., the human-machine interface 202, or another portable electronic devices, such as smartphones, tablets, laptop computers) or other controller (e.g., at a base station). The flight control system 120 may also communicate with another aerial vehicle 100 via the wireless transceiver 130, thereby facilitating collaborative operations, for example.

In certain aspects, the flight control system 120 may communicate data (processed data, unprocessed data, etc.) with the remote device 138 and/or another aerial vehicle 100 over a network 134. In certain aspects, the wireless transceiver 130 may be configured to communicate using one or more wireless standards such as Bluetooth (e.g., short-wavelength, Ultra-High Frequency (UHF) radio waves in the Industrial, Scientific, and Medical (ISM) band from 2.4 to 2.485 GHz), near-field communication (NFC), Wi-Fi (e.g., Institute of Electrical and Electronics Engineers' (IEEE) 802.11 standards), etc. The remote device 138 may facilitate monitoring and/or control of the flight control system 120 and its payload(s), including an ISR payload 140.

The aircraft processor 124 may be operatively coupled to the flight controller 126 to control operation of the various actuators 130 (e.g., those to control movement and locking of any flight surfaces, such as the moveable flight control surfaces, electric motor 108 (e.g., via an electronic speed controller (ESC) 116), and/or engines 118 (e.g., via an engine controller 122) in response to commands from an operator, autopilot, a navigation system 142, or other high-level system via the wireless transceiver 130. In certain aspects, the aircraft processor 124 and the flight controller 126 may be integrated into a single component or circuit. In operation, the flight controller 126 may dynamically (i.e., in real-time or near real-time) and independently adjust thrust during the various stages of flight via the ESC 116 or engine controller 122 (as the case may be) to control roll, pitch, or yaw of the aerial vehicle 100. When rotors with rotor blades (e.g., propellers) are used, the flight controller 126 may vary the revolutions per minute (RPM) of the rotor and/or, where desired, vary the pitch of the rotor blades. For example, the electric motors 108 may be controlled by adjusting power supplied to each electric motor from a power supply (e.g., a battery pack or a battery bank) via the ESC 116.

The aircraft processor 124 may be operatively coupled to the navigation system 142, which may include the GPS 142a that is communicatively coupled with the INS 142b and/or the IMU 142c, which can include one or more gyros and accelerometers. The GPS 142a gives an absolute drift-free position value that can be used to reset the INS solution or can be blended with it by use of a mathematical algorithm, such as a Kalman Filter. The navigation system 142 may communicate, inter alia, inertial stabilization data to the aircraft processor 124.

To collect data and/or monitor an area, the flight control system 120 may be equipped with additional sensors 110, such as an ISR payload 140 comprising, for example, one or more cameras 140a (e.g., an optical instrument for recording or capturing images and/or video, including light detection and ranging (LiDAR) devices), audio devices 140b (e.g., microphones, echolocation sensors, etc.), and other sensors 140c to facilitated ISR functionality and provide ISR data (e.g., photographs, video, audio, sensor measurements, etc.). The ISR payload 140 is operatively coupled to the aircraft processor 124 to facilitate communication of the ISR data (sensor data) between the ISR payload 140 and the aircraft processor 124. The ISR data may be used to navigate the aerial vehicle 100 and/or otherwise control the flight control system 120 (e.g., via the A3 system). In certain aspects, the ISR payload 140 may be rotatably and pivotally coupled to, for example, the underside surface of the airframe 102 (or another structural component, such as the rotor booms 112 or the wings 114) via a gimbal system to enable the ISR payload 140 to be more easily oriented downward to monitor objects below and/or on the ground. The data may be dynamically or periodically communicated from the flight control system 120 to the remote device 138 over the network 134 via the wireless transceiver 130, or stored to the memory device 128 for later access or processing.

The below-described autonomy system 200 may be integrated with the flight control system 120 such that it uses preexisting hardware, including, for example, the aircraft processor 124, memory device 128, flight controller 126, and sensors 110. In this example, the features and processes of the autonomy system 200 may be implemented in the aircraft 100 through a software and/or firmware update (e.g., to the memory device 128 via the human-machine interface 202). In other aspects, the autonomy system 200 may be provided as a standalone modular attachment and, to that end, may be removably coupled with the aircraft 100/flight control system 120 via a power/data connector, in which case the autonomy system 200 may include a dedicated A3 processor 140 coupled to an A3 memory device 142, controller 144, and sensors 110. As illustrated, the sensors 110 may be provided as part of the aircraft 100, as part of the modular autonomy system 200, or a combination thereof. Therefore, even where the autonomy system 200 is modular and removable, it is still contemplated that the autonomy system 200 may use preexisting sensors and/or devices already present on the aircraft 100, thereby reducing cost, weight, and complexity of the autonomy system 200. In other aspects, the autonomy system 200 may be a common platform on which one or more vehicles operate. For example, multiple vehicles may operate based on the functionalities of the autonomy system 200, such that machine-executable steps are communicated from the common source (i.e., autonomy system 200) to each of the one or more vehicles. Each of the multiple vehicles may utilize available operating rules, decision criteria, command generation, and the like from the common autonomy architecture.

In one embodiment, the autonomy system 200 may be implemented as a standalone and dedicated device including hardware and installed software, where the hardware is closely matched to the requirements and/or functionality of the software. The standalone device may be configured to integrate with additional input/output devices available from the vehicle on which the autonomy system is installed.

In another embodiment, the autonomy system 200 may be installed on or integrated with a network appliance configured to establish a networked communication among multiple vehicles. The autonomy system and the network appliance may operate as or provide an interface to assist exchange of data (i.e., software instructions) among the multiple vehicles. For example, a ground command center may implement the execution of the autonomy system 200 and communicate with the vehicle's flight control system 120.

In yet another embodiment, the autonomy system 200 or one or more modules of the autonomy system 200 may be installed on or integrated with one or more vehicles. As such, the autonomy system 200 may be integrated with any number of vehicles in a distributed fashion. For example, one vehicle may execute the steps involved with the situational awareness module 204 while another vehicle executes the steps involved with the task planning module 206, and so on. The manner in which the functionalities of the autonomy system 200 is distributed to a number of vehicles would be appreciated by one of ordinary skill in the art to satisfy the intended purpose.

Figure 2A:
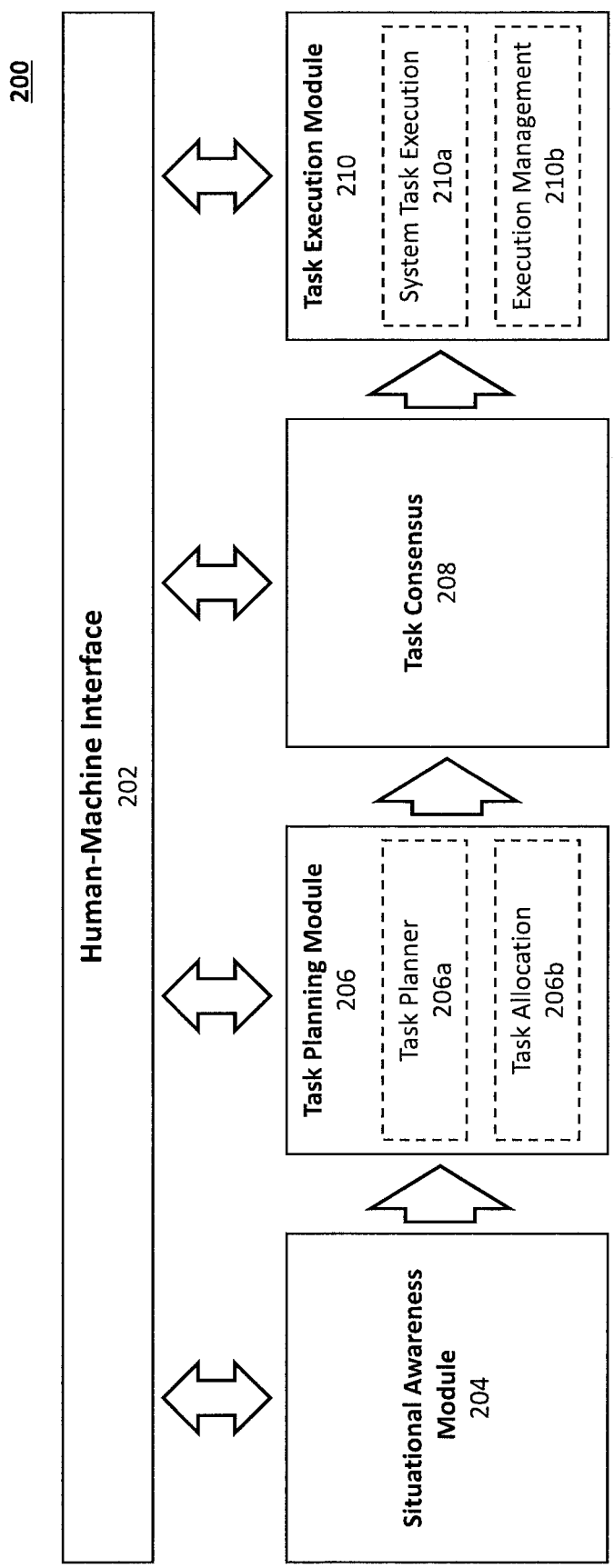
FIGS. 2a through 2c illustrate block diagrams of example Adaptable Autonomy Architecture (A3) systems.

FIG. 2a presents a high-level system level architecture for the adaptive autonomy architecture (A3) system 200 having four main modules. As illustrated, the A3 system 200 may include four general algorithmic modules: situational awareness module 204, task planning module 206, task consensus module 208 (if multiple collaborative vehicles are networked), and task execution module 210. Each of the general algorithmic modules may be provided (or otherwise facilitated) using one or more processors (e.g., processors 124, 140) operatively coupled with other hardware, such as memory devices (e.g., memory devices 128, 142), control systems (e.g., controllers 126, 144), and sensors (e.g., sensors 110).

Figure 2B:
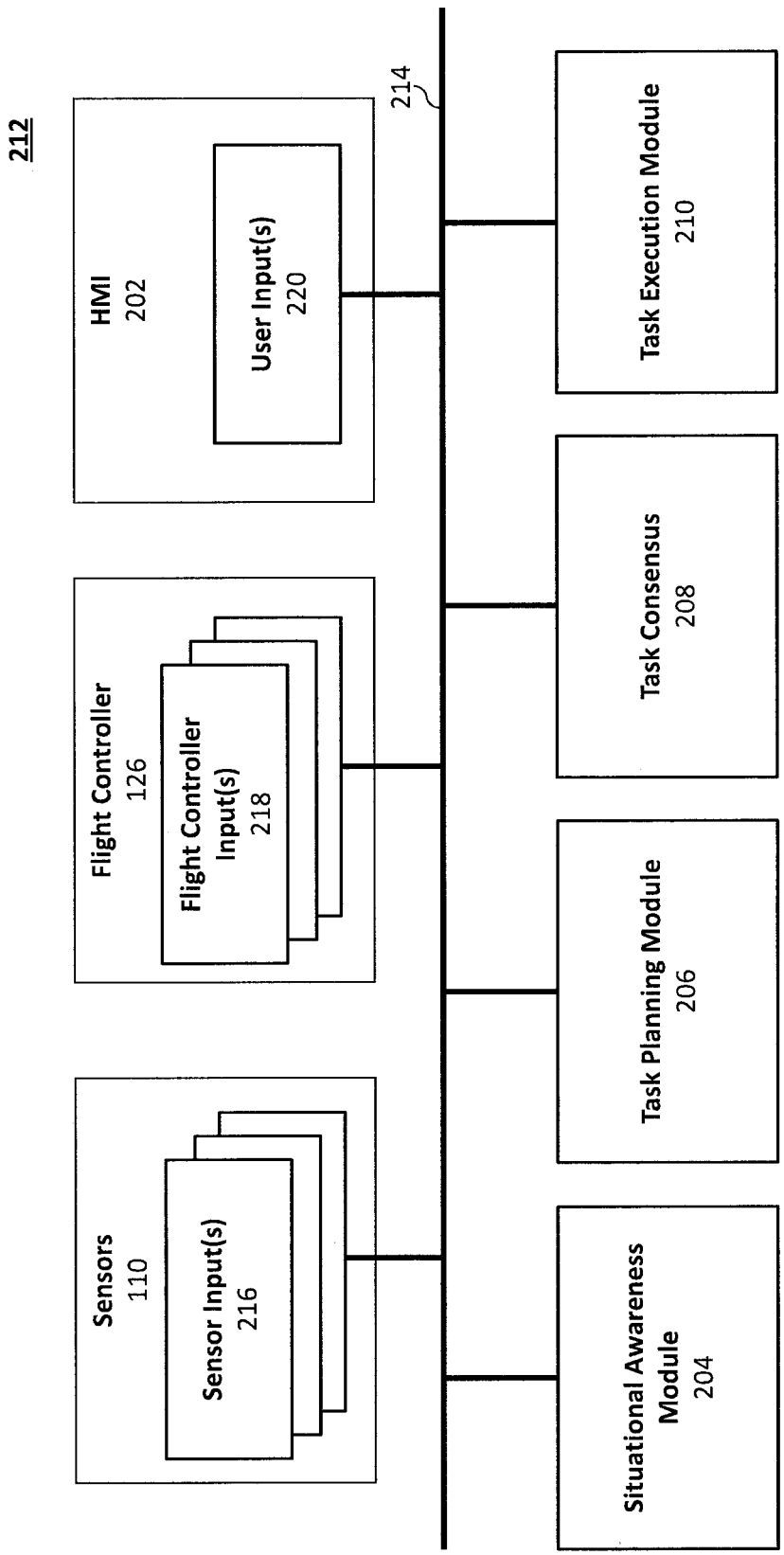

FIG. 2b illustrates an exemplary high-level autonomy system environment 212 for providing the autonomous functions describes herein. As illustrated, the situational awareness module 204, task planning module 206, task consensus module 208 (where applicable), and task execution module 210 may be coupled to one another via a communication bus 214. One or more of the situational awareness module 204, the task planning module 206, the task consensus module 208, and/or the task execution module 210 may receive sensor inputs 216 from one or more sensors 110, flight control inputs 218 from the flight controller 126 (or processor 124), and/or user inputs 220 from the human-machine interface 202 (or other system). To allow for wireless communication of data between the A3 system 200 with a remote location, the communication bus 214 may employ a wireless transceiver, such as wireless transceiver 132.

Figure 2C:
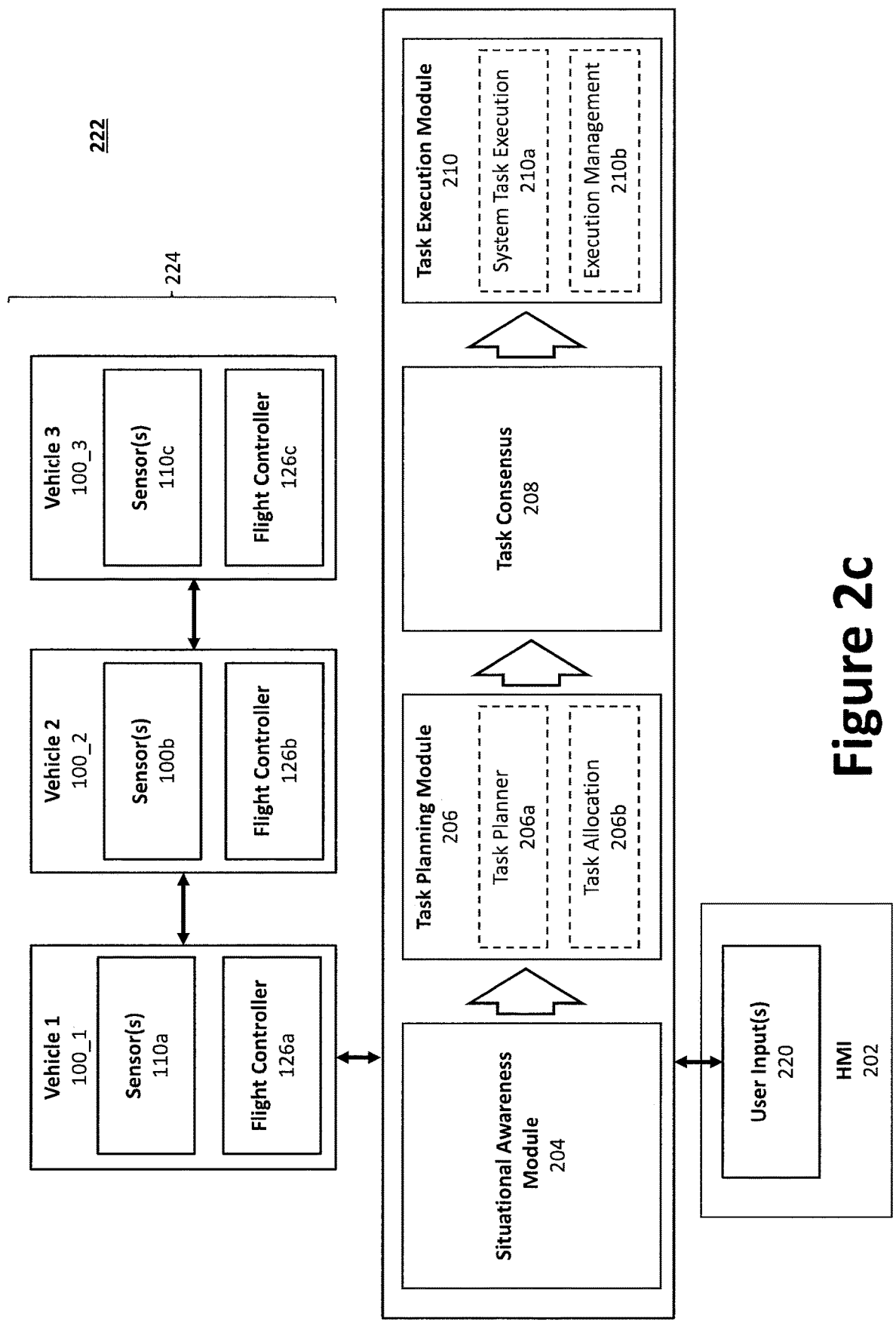

FIG. 2c illustrates an exemplary architecture for the A3 system 222 in a multi-vehicle network environment. As illustrated, the functions of the four modules (e.g., the situational awareness module 204, the task planning module 206, the task consensus module 208, and the task execution module 210) can be distributed and/or carried out via a network appliance (e.g., a server) in communication with a first aerial vehicle (e.g., first aerial vehicle 100_1), which may serve as the lead aerial vehicle. The remaining aerial vehicles (illustrated as a second aerial vehicle 100_2 and a third aerial vehicle 100_3) may be communicatively coupled with the first aerial vehicle 100_1. The first, second, and third aerial vehicles 100_1, 100_2, 100_3 define the aerial vehicle swarm 224. While the aerial vehicle swarm 224 is illustrated as having only three aerial vehicles, as noted above, there may be hundreds or even thousands of aerial vehicles in the aerial vehicle swarm 224. In operation, signals (senor data and control signals) from the lead vehicle may be used by the other vehicles to carry out the task execution, where the lead vehicle may similarly use signals from the other vehicles in carrying out instructions. To that end, each of the aerial vehicles may include one or more sensors 110a, 110b, 110c and a flight controller 126a, 126b, 126c. Data from the one or more sensors 110a, 110b, 110c and/or the flight controllers 126a, 126b, 126c may be shared between the aerial vehicles in the aerial vehicle swarm 224 (e.g., functioning as a mesh network). At least a portion of the sensor data from one or more sensors 110a, 110b, 110c may be fused into a unified sensor data and processed by one or more of the four modules (e.g., the situational awareness module 204, the task planning module 206, the task consensus module 208, and the task execution module 210), to provide a control signal to each of the flight controllers 126a, 126b, and 126c. In some aspect, the lead aerial vehicle (e.g., the first aerial vehicle 100_1) may exclusively communicated with the four modules. The sensor data from the second aerial vehicle 100_2 and the third aerial vehicle 100_3 may be transmitted to the lead vehicle. As such, the lead vehicle may operate with an on-board processor to manage the communication between the lead vehicle and the four modules (e.g., the situational awareness module 204, the task planning module 206, the task consensus module 208, and the task execution module 210). Control signals for the flight controller 126b and 126c may be transmitted from one or more of the four modules via the lead aerial vehicle 100_1.

The modules enable the A3 system 200 to acquire information, define, and order a plurality of tasks, coordinate the plurality of tasks with other systems/users, and execute the plurality of tasks in accordance with the task assignment list. For example, the A3 system 200 may be configured to acquire, via the situational awareness module 204, information received through user interaction (via a human-machine interface 202) and/or from sensors 110, whether onboard or off-board, including those on the ground, other aerial vehicles, watercraft, spacecraft, etc. Using the task planning module 206, the A3 system 200 may define and order tasks, where the task planning module 206 is able to incorporate rules of engagement, tactics, and other constraints on operations. The A3 system 200 may then, via the task consensus module 208, coordinate tasks with other vehicles and users, where the agreed-upon tasks may then be executed by the A3 system 200 through the task execution module 210. The A3 system 200 provides a complete, end-to-end autonomy architecture with open standard interface control documents (ICDs) and parameterized that allow rapid extension and reapplication to new vehicles and/or other autonomous systems. The flexibility of the A3 system 200 enables an operator to code it once, but to apply it anywhere. Therefore, while the A3 system 200 will be described primarily in connection with an aircraft (e.g., the aircraft 100a, 100b), the A3 system 200 may be applied to virtually any other vehicles or system that applies, or benefits from, autonomy. For example, the A3 system's 200 adaptable autonomy architecture may be applicable to a variety of autonomous systems, including, inter alia, aircraft, ground vehicles (e.g., automobiles), underwater vehicles, surface watercraft, spacecraft, and even purely software-based systems (e.g., cyber/virtual systems). Therefore, a benefit of the A3 system 200 is not only in the specific contents, but also in the specific details of the architecture, its subroutines, and in the interfaces between those subroutines and other systems/devices that support rapid extensibility and adaptability of the A3 system 200 to a variety of domains.

The following description details the various components of the A3 system 200 at a high level, then at more detailed levels, before describing how those elements are parameterized and modularized in order to support rapid extensibility. At the highest level, with reference to FIG. 2, the A3 system 200 may comprise five modules, with information and commands generally flowing from left to right with a human-machine interface 202 supporting each module as needed by a given module. Specifically, as noted above, the modules may include a human-machine interface 202, a situational awareness module 204, a task planning module 206, a task consensus module 208, and a task execution module 210.

Starting from the left, the A3 system 200 acquires information on the state of the environment using the situational awareness module 204. That information is processed by the task planner 206a to generate an understanding of which tasks the vehicle can execute (perform) and how it should execute them. The task allocation 206b may be used to optimize the ordering of those tasks based on predetermined criteria. Where it is necessarily and/or useful, the task consensus module 208 negotiates the selection of tasks with other collaborative systems. Once the tasks are negotiated, the task execution module 210 executes those tasks in the environment (e.g., in accordance with a task assignment list). The human-machine interface 202 provides a communication link between the A3 system 200 and any human operators or supervisors that interact with the system. The human-machine interface 202 may not be needed when human inputs are not necessary. For example, other inputs may be communicated directly to the A3 system 200 from other systems or sensors, such as sensor inputs, flight control inputs, etc.

The situational awareness module 204 may employ a set of algorithms and subroutines (e.g., saved to a memory device) that retrieve sensor data regarding the external environment (e.g., from the sensors 110, which may include such as LiDAR data, air temperature, barometric pressure, and other sensor inputs) and regarding the system being operated by A3 system 200 (e.g., aircraft 100). For example, the situational awareness module 204 may receive data from sensors aboard the vehicle (whether integrated or add-on) reflecting, for example, battery temperature/capacity/status, fuel temperature/amount, engine/motor, RPM, speed, etc. The situational awareness module 204 processes the raw sensor data into measurements of the vehicle and surrounding environment. The situational awareness module 204 fuses and reduces the measurements between sensors of identical objects into a standard format, which can be prioritized based on mission objectives to aid the next module (i.e., the task planning module 206). Each sensor is usually tuned to specific sets of objects that it can detect based on modality and sensor parameters. Sensors 110 also vary on outputs, including outputting raw sensor data, track observations, and current state of observed tracks. The situational awareness module 204 accepts inputs from each of the sensor types, fusing the track data with other sensors as well as incorporating raw data processing as necessary to generate new observations. For example, the sensor data may be processed to provide a reduction into knowledge about trees, cars, obstacles in the environment, other vehicles, or filtering of inertial measurement unit data to estimate vehicle state. The tracks generated from other vehicles or threats are processed by a prioritization algorithm. The prioritization algorithm finds tracks that are of interest in the mission objectives, or tracks that may impede progress towards mission objectives, and orders them above other tracks to aid mission planning.

The task planning module 206 module uses the track, environmental, and system data to understand the state of the environment and to determine the appropriate order in which those tasks should be executed (a task assignment list) to achieve the objectives given to it. As used herein, a "task" refers to an activity that the A3 system 200 can execute, such as a vehicle traveling to a specific point in space, or activating a particular piece of hardware or software. In another example, the tasks may include commanding an automobile to drive to a certain location, or to execute a turn, or stop, or a system commanding a valve to open or shut, or a pump being activated or deactivated. Parameterized tasks can be defined a priori to system execution by developers or by the human operator through the human-machine interface 202, and given specific parameters, while generating a mission execution plan. Examples of tasks search of an area using an electro-optical and infrared (EO/IR) camera in wide field-of-view for stationary threats, intercept an air-to-air target and engage with a projectile, or fly to coordinate and loiter until further instructions are received. A collection of tasks may be stored to the memory device 128 in the form of a task database, which may be updated as the A3 system 200 is applied to other vehicles or autonomy systems.

As illustrated, the task planning module 206 may employ two or more subroutines, including a task planner 206a and task allocation 206b. The task planner 206a translates information from the situational awareness module 204 into details about the task and its characteristics. As an example, task details for a ground vehicle traveling to a specific location include total time duration for travel, total distance traveled, the specific path being traveled, total fuel/energy consumed, and probability of failure. This performance data provides the cost data of executing that task.

Performance data includes the expected results of a task choice that can help decide whether or not that task should be chosen for execution. Performance data is used as a decision basis for other subroutines in task planning module 206 that address task allocation 206b. The task allocation 206b subroutine reviews the related performance data for some or all available tasks and determines which tasks should be executed and in which order (e.g., based on mission objectives and evaluation criteria supplied by the operator of the human-machine interface 202) and which vehicles should perform the tasks. Evaluation criteria include such things as minimizing total fuel consumed, minimizing total duration of time, or maximizing probability of success. The task planners 206 can use many services, such as route planning, trajectory planning, probability of success estimation, sensor planning, etc.

If the A3 system 200 has sufficient resources to execute all tasks, task allocation 206b may determine the optimal ordering of those tasks under the requested criteria; otherwise, task allocation 206b determines the best subset of tasks (and order of execution thereof) that can be executed under the given criteria. Some examples of algorithms that can implement task allocation 206b are branch and bound, mixed integer linear programming, genetic algorithm, and simulated annealing.

The task consensus module 208 can be is utilized where multiple vehicles executing an A3 system 200 are linked together in a collaborative arrangement (e.g., working together to achieve a goal). Example collaborative tasks included, inter alia, traveling in formation, performing a single task collaboratively, assigning landing zone if landing in the same area, setting up keep-off distances, parking, etc. The task consensus module 208 can receive information on the tasks that other collaborating vehicles are considering executing. These tasks can include single vehicle tasks, as well as multi-vehicle tasks such as formation flying, multi-sensor ISR, multi-vehicle engagements, etc. In other words, the task consensus module 208 may analyze a first task assignment list of a first vehicle vis-à-vis a second task assignment list (e.g., associated with a second vehicle that is equipped with an autonomy system), which comprises a second plurality of tasks. The task consensus module 208 on each vehicle reviews the possible task assignment lists that other vehicle(s) has/have generated, and negotiates with other vehicle(s) on which set of tasks to execute to maximize overall efficiency of the team as a whole. Some examples of negotiation techniques are leader command (one vehicle in decides), auctioning (broadcast assignment costs), bundling (group tasks and mix the options with costs functions), and deterministic decisions (guarantee all vehicles arrive at the same answer).

The task consensus module 208 can be configured to adjust the first task assignment list based at least in part on the second task assignment list. Thus, the task consensus module 208 may adjust the task assignment list based at least in part on the second task assignment list to maximize overall efficiency of the vehicle and the second vehicle in performing a collaborative objective. For example, the task consensus module 208 may reallocate tasks between the task assignment list and the second task assignment list depending on the needs of the mission. In another example, the task consensus module 208 may reorder said plurality of tasks based at least in part on the second task assignment list (vice versa, for example, the other vehicle may reorder the second task assignment list based on the first task assignment list). In yet another example, where the first plurality of tasks and the second plurality of tasks overlap at least in part, duplication may be mitigated by removing any overlapping tasks from one of the task assignment lists. Similarly, if one vehicle completes a task (e.g., from the second task assignment list), the task consensus module 208 may remove the task from the first task assignment list. Accordingly, the various task assignment lists may be updated dynamically (e.g., in real-time or near real-time) as the vehicle (or other vehicles) complete tasks.

Once all task consensus modules 208 across all A3-enabled systems reach a consensus (i.e., agree) with their new task allocations, task assignment lists are finalized for each vehicle and are sent to the task execution module 210 for execution. If there is only one vehicle active, however, the task consensus module 208 may be bypassed such that the task assignments proceed directly from task planning module 206 to task execution module 210 (e.g., in the form of a task assignment list).

The task execution module 210 receives a final task assignment list and handles the monitoring an execution of tasks in that list. For example, in connection with an aircraft, the task execution module 210 may instruct the flight control system 120 to control the various thrust generators 106, control surfaces, actuators 130, and/or sensors 110 to perform (and monitor execution of) the desired tasks. In the case of an driverless automobile, a finalized task list may be sent to a driverless automobile that includes a series of tasks navigating the automated automobile to various waypoints on a route to a destination, a task to wait in an area to be loaded with cargo by personnel, a task to transit to through another series of waypoints, a task to wait in an area to be unloaded by other personnel, followed by a task to navigate to a final destination to be refueled. This list of tasks can be provided by either the task planning module 206 or the task consensus module 208.

The task execution module 210 may include subroutines, such as system task execution 210a and execution management 210b. Execution management 210b maintains oversight of the list of tasks, ordering the A3-enabled system (e.g., the aircraft, automobile, etc.) to execute the first task in the system, which utilizes the system task execution module 210a subroutines. The system task execution 210a subroutine may include specific software and hardware related to implementing tasks in the environment. In connection with an automated automobile, for example, the system task execution 210a subroutine executes software that translates navigation commands to a specific point in the environment into commands for the steering wheel to turn the car and to commands for the accelerator and brakes for managing vehicle speed. In operation, the execution management 210b subroutine monitors the execution of active tasks to identify failures (or other errors) in execution that may require tasks to be reordered or abandoned, as well as monitoring for when tasks are completed so that the next task can be started. Subroutines in system task execution module 210*a* are analogous to routines in system task planning module 206, but reconfigured to support execution of tasks rather than projecting how tasks would be executed.

The human-machine interface 202 provides a control and communication interface for the user. The human-machine interface 202 is configurable to operate as a manager that enables the user to monitor, direct, and control the A3 system 200. The human-machine interface 202 can be used to enable a user to input tasks, constraints, revise task assignment lists, update software/firmware, etc. The human-machine interface 202 may include a touch screen graphical user interface ("GUI") and/or speech-recognition systems. The human-machine interface 202 may employ, for example, a tablet computer, a laptop computer, a smart phone, or combination thereof. The human-machine interface 202 serves as a primary channel of communication between the pilot and the A3 system 200, enabling the user to command tasks to and receive feedback or instructions from the A3 system 200. The human-machine interface 202 may give visual and auditory alerts to direct the pilot's attention to a particular alert. In a fully autonomous system where human input is not necessary, the human-machine interface 202 may be a machine interface to facilitated communication between different systems (e.g., communication bus 214), an example of which is illustrated in FIG. 2*b*. In certain aspects, the human-machine interface 202 also may be a centralized input. For example, a ground station may provide input to the A3 system 200, the result of which can be communicated to one or more aerial vehicles 100.

Figure 3:
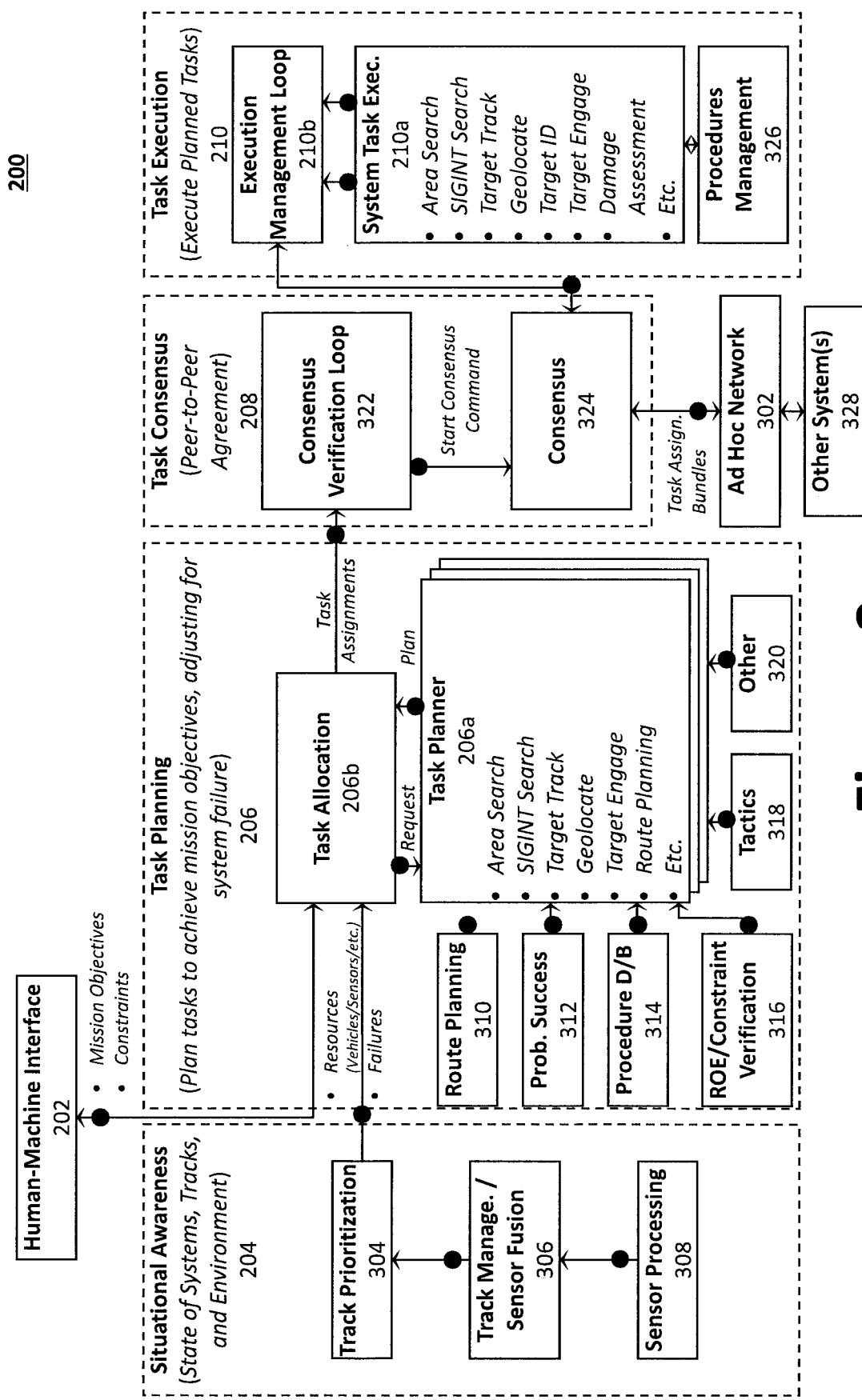
FIG. 3 illustrates a more detailed block diagram of an example A3 system.

FIG. 3 illustrates the architecture diagram of the A3 system 200 and its various subcomponents in greater detail, including additional blocks for subroutines for the four above-described modules. As illustrated, the situational awareness module 204 may provide sensor processing routines 308, track management and sensor fusion routines 306, and track prioritization routines 304.

Sensor processing routine 308 provides processing (e.g., computer implemented software/routines) that serve to process raw incoming data from sensor systems 110 into more standard computer information. For example, the sensor processing routine 308 may translate raw outputs from LIDAR sensors into point clouds, translate potentiometer readings into position information, radar measurements into vehicle track states, IR camera data reduced into high accuracy angle measurements for tracks, system health monitoring algorithms, and track prioritization to determine which tracks are most important for mission objectives. In one aspect, the situational awareness module 204 may receive raw measurements from LIDAR sensors. LIDAR may be equipped by an aircraft (or other vehicle) to essentially detect and locate objects around the aircraft. The LIDAR measurement data may be filtered in order to detect relevant objects within the scanned area. In addition, multiple areas may be scanned to construct obstacle locations in multiple directions from the vehicle. Once LIDAR data is obtained by the situational awareness module 204, the raw data may be processed to identify locations of obstacles relative to the vehicle's position, such that the situational awareness module 204 ultimately constructs a virtual map.

The track management and sensor fusion routine 306 merges measurements from independent sensors on identical tracks into single sets of states for those tracks. These algorithms include association to tracks, discriminations between tracks, filters to merge sets of data, and higher level identification of the objects comprising the tracks. Some examples of algorithms include information filter, unscented Kalman filter, particle filter, multiple hypothesis filter, and neural networks for identification.

Sensor fusion not only fuses data from multiple onboard and/or off-board sensor sources, but also communicates with other vehicles to merge track data into a single unified common operating picture. Therefore, while sensor fusion allows for different types of sensors onboard, sensor fusion is particular useful because it can merge different sensor data into an input that outperforms independent uses of those sensors in combination. Sensor fusion applies not only to multiple sensor sources of one vehicle, but also a collaboration of sensor inputs from multiple vehicles in different locations (e.g., to generate a 3D map in collaboration with visions from multiple locations).

Track prioritization routine 304 determines which of the tracks are important to, or relevant for, the task planning module 206 to consider first. For example, a set of vehicles are cruising at altitude enroute to an airport and detect an anti-air threat. The prioritization algorithm may identify the anti-air threat as a track that can affect the mission and prioritize it for consideration by the task planning module 206 to consider. Other tracks, such as commercial flights, are unlikely to affect the mission and are reduced in priority. Some examples are simple sorting algorithms for type, neural networks, and machine learning algorithms to predict importance. The various resources (e.g., vehicle(s), sensors, etc.), tracks, and failures may be communicated from the track prioritization routine 304 to the task planning module 206 for further processing.

As illustrated, the task planning module 206 may provide task planner 206*a* and task allocation modules 206*b*. The task planner 206*a* and task allocation modules 206*b* may be communicatively coupled to one another such that the task allocation 206*b* requests a task from the task planner 206*a* and, in response, the task planner 206*a* send a task plan to the task allocation 206*b* routine. Based on this input, the task allocation 206*b* routine can communicate a resulting task assignment to the next block (e.g., task consensus 208 or task execution 210, depending on whether a single vehicle or multiple vehicles are deployed.

As illustrated, the task planner 206*a* is configured to receive inputs from a variety of sources, including a route planning routine 310, a probability of success routine 312, a procedure database 314, a rules of engagement (ROE) and constraint verification routine 316, a tactics component 318, and/or any other desired routine 320.

The route planning routine 310 plans a path of travel for a vehicle through the environment, based on the minimization of a cost function. Examples of such algorithms include the A* algorithm, D* incremental search algorithm, rapidly exploring random tree (RRT), and RRT* path planning routines. The RRT and RRT* algorithms are described in greater detail by Sertac Karaman and Emilio Frazzoli, *Incremental Sampling-based Algorithms for Optimal Motion Planning*, International Journal of Robotics Research (2010).

The probability of success routine 312 determines the likelihood of success of certain tasks executed in the environment. For example, a probability of success routine 312 could establish the likelihood of a deployable object reaching its target given its release at a specific altitude, heading, and initial vehicle speed. Others may include routines that determine the likelihood of a vehicle reaching its target destination on time given uncertainty in winds, road conditions, or other relevant factors.

The procedure database 314 provides a list of activities and tasks that must be executed in support of task execution module 210. This could include database models that include procedures for executing takeoff and landing of an aircraft that, while not a high-level task for the system, must be executed in order to achieve high level tasks. For example, the procedure for powering a sensor for an ISR mission may include powering the sensor, waiting for boot up, initializing parameters, transfer aligning, and sending coordinates of the target to observe. These procedures are important to execute higher level tasks such as ISR missions.

The ROE and constraint verification routine 316 checks tasks against known conditions and rules that describe how the system should not behave. This includes specifying geographic constraints (e.g., a particular task may not be executed within this defined area), temporal constraints (e.g., a particular task may not be executed before or after a given time, or within a specific time window), ordering constraints (e.g., a particular task may not occur before or after another task), and other similar extensions. A simple example is a constraint that operator permission must be given for a vehicle to engage a target with force. Without operator permission, the vehicle will not choose tasks that engage targets, but attempt to complete mission objectives in other ways.

The tactics component 318 concerns the definition of logical rules that describe how tasks should be executed within the system. The tactics component 318 matches a track from the situational awareness module 204 to tasks that can operate on that track, valid parameters, and which parameters and tasks are allowed by the operator. For example, consider the objective to find targets in a large area. For example, where a situational awareness item is the area that needs to be searched and how much of it has been observed, the tactics component 318 will compare the situational awareness item to available tasks that can be performed.

In this case the available tasks may be an area search with EO/IR, target tracking with EO/IR, or return to base. The tactics component 318 can match the situational awareness item to the task to perform an area search using an EO/IR sensor. The task needs parameters to generate execution data. For this task, some parameters may be the area to search, available airspace, how many pixels on target are required, and aircraft speed and altitude restrictions. The tactics component 318 can provide that range of parameters acceptable for this vehicle and current ROE. Task allocation 206b will later find an acceptable set of parameters to accomplish mission objectives. Examples of algorithms that can accomplish the tactics component 318 are database lookups, machine learning algorithms to predict which tasks are most useful, and neural networks.

A task planner 206a routine, as described earlier, takes a single task submitted into the A3 system 200 and calls the appropriate routines listed above (and any other desired routines 320) to generate requisite performance information for use in the task allocation modules 206b. Task allocation modules 206b then assemble the resulting data from task planner 206a routines in order to determine the appropriate set of tasks that should be executed and their ordering.

As illustrated, the task consensus module 208 may provide a consensus verification loop 322 and a consensus routine 324. The consensus routine 324 may employ algorithms that review the currently-assigned tasks for a single A3-enabled vehicle (or other system) and other networked A3-enabled systems 328 (via a network 136, such as an ad hoc network 302, for example) to determine whether or not the allocation of tasks can be improved. The consensus routine 324 negotiates with other vehicles in the team to determine which set tasks generated on the vehicles to execute to accomplish mission objectives. For example, consider two vehicles that have the task to search and track a target. The first plan accepted to search an area, with the following plan to track the target. Halfway through the search the vehicles find the target. Rather than continue the area search, the vehicles re-plan to track the target. This new plan would go through the consensus routine 324.

Consensus verification loop 322 acts as an oversight system that tracks the consensus routines 324 to determine whether or not the optimal allocation has been reached (or at least, the quality of task allocation 206bs is not improving). The consensus verification loop 322 consistently checks to verify that the team is in agreement as to which set of tasks are to be executed. If the vehicles ever go out of sync, then the consensus starts again to come to agreement on the set of tasks to execute.

As illustrated, the task execution module 210 may provide a system task execution module 210a, an execution management loop routine 210b, and a procedures management module 326.

The system task execution module 210a employs algorithms that act as operationalized versions of the task planner 206a algorithms. Rather than planning out a task and how it should be executed, these algorithms actively command other hardware and software systems to execute that task in the environment actively, monitoring the behavior of commanded software and hardware to ensure they function correctly to execute the task.

The procedures management module 326 includes algorithms that act as operationalized versions of the procedures database 314 in the task planner module 206. The algorithms load in the appropriate procedural tasks required to support the system task execution module 210a.

The execution management loop routine 210b manages overall oversight of the execution of tasks assigned to the A3-enabled system. The execution management loop routine 210b provides an operationalized version of the task allocation module 206b in the task planner 206a.

Missions rarely execute exactly as planned because the environment, other vehicles, and/or team vehicles can be subjected to unexpected and/or expected state changes. Therefore, the execution management loop 210b periodically (or dynamically) checks the current predicted outcome of the mission plan throughout mission execution. If the probability of success falls below a predetermined threshold value (e.g., a predetermined success percentage), a team re-plan is initiated. This can occur for any number of reasons. Some examples are sensor failure on a vehicle that prevents future ISR, loss of a vehicle, or a detected threat that could cause the loss of a vehicle on the team.

An advantage of the A3 system's 200 design is that its components and modules are designed to adhere to standard ICDs that govern the publishing of data between routines and between modules (illustrated as black circles in FIG. 3; the parameterization of routines so that they can be readily adapted to support new vehicles and new systems); and the architecture of modules and communications so that if a subroutine is not included, other subroutines know that it does not exist and adapt their behaviors appropriately.

In terms of parameterizing algorithms, for example, a route planning algorithm can be written that works equally well for both aircraft and ground vehicles, if the algorithm is designed to import related constraints and physics of motions of the vehicles from other databases and files, rather than coding them directly into the interface. Parameterizing algorithms and standardizing ICDs between elements allows the system to accept new code easily into its library, which may be stored to a memory device 128, 142 as a database, minimizing integration costs within the system. The A3 system's 200 memory device 128, 142 may also include a vehicle characteristics database to allow for easy integration with new vehicles. While the A3 system has been described primarily in connection with unmanned and autonomous aircraft, the A3 system may be employed in various autonomy systems and autonomy domains, including, inter alia, spacecraft, watercraft, underwater vehicles, ground vehicles, and cyber security systems.

Figure 4:
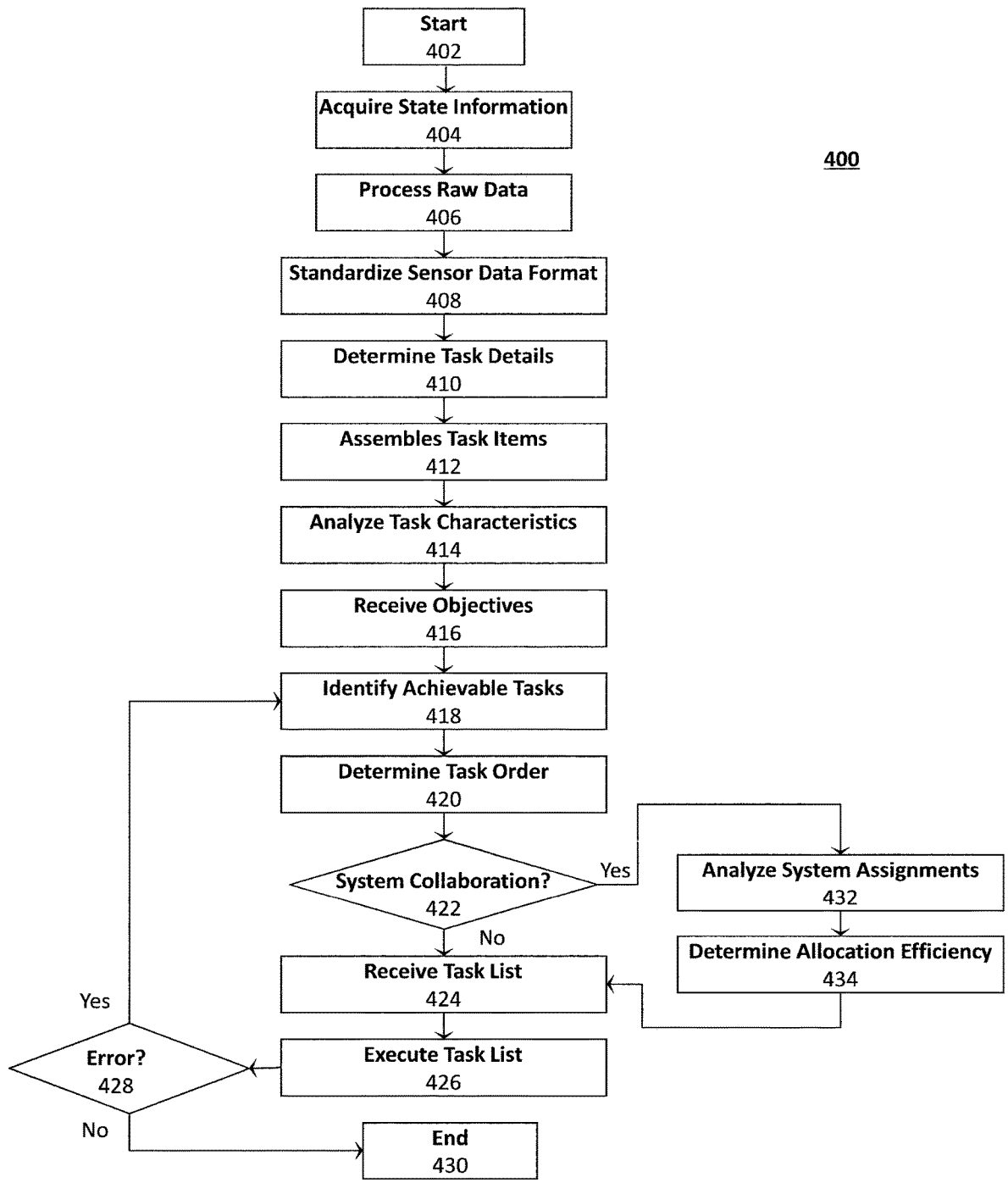
FIG. 4 illustrate a flow chart of an example system automation process.

FIG. 4 is a flow chart of an example automation process 400 for controlling a system (e.g., a vehicle or other system). Upon start up at step 402, the situational awareness module 204 may be configured to acquire, at step 404, information on the state of the environment, sensor data on external environment, and the operating system itself. At step 406, the situational awareness module 204 processes raw sensor data into measurements of the vehicle and surrounding environment. At step 408, the situational awareness module 204 processes sensor readings of an identical object, which are fused and reduced into an appropriate format (e.g., a standardized format).

As noted above, the task planning module 206 receives the standardized sensor data from the situational awareness module 204 and identifies determine system capabilities. For example, what the vehicle/system can do, how it should do, ordering, and negotiate the selection. The task planning module 206 also determines the tasks/activities that the system can execute based at least in part on the sensor data, procedure database, ROE, and/or constraint verification routines. Finally, the task planning module 206 determines the order of tasks based on objective given to it and processes the parameterized tasks. To that end, as described in connection with FIGS. 2 and 3, the task planning module 206 may comprise two or more subroutines, including a system tasks planner subroutine 206a and a task allocation subroutine 206b.

At step 410, the system tasks planner subroutine 206a translates the standardized information from the situational awareness module 204 into details about the task and its characteristics (task details and characteristics). The task allocation subroutine 206b then assembles task items at step 412 and analyzes the related tasks characteristics at step 414. At step 416, the task allocation subroutine 206b receives (via human-machine interface 202, for example) mission objectives and evaluation criteria. At step 418, the task allocation subroutine 206b determines subset of tasks achievable under the circumstances (e.g., constraints on the system). At step 420, the task allocation subroutine 206b determines task allocation and order (e.g., a task allocation list) based on one or more of task characteristics, mission objectives, evaluation criteria, etc.

If, at step 422, it is determined that the system is to work in collaboration with one or more other systems (e.g., there are multiple vehicles or other systems linked together or an operator is in the control loop that approves plans, which may be inputted at human-machine interface 202), the automation process 400 proceeds to step 432, otherwise, the automation process 400 proceeds to step 424 for execution of the task assignment list (e.g., from step 420). At step 432, the task consensus module 208 analyzes task assignment list from each system and, at step 434 determines overall efficiency by negotiating for re-allocation of tasks between the systems. Based on the processing at steps 432 and 434, the tasks may be reallocated and a new task assignment list may be generated for one or both of the systems.

The task execution module 210 may comprise two subroutines, including a system tasks execution subroutine 210a and an execution management subroutine 210b. At step 424, the system tasks execution subroutine 210a receives a task assignment list (e.g., from either the task planning module 206 or the task consensus module 208, as the case may be) and actuates execution of the task assignment list at step 426. The execution management subroutine 210b monitors at step 428 execution of each task of the task assignment list for an error and, if an error is identified, reorders or abandons the execution of the task assignment list. For example, the automation process 400 may return to step 418 so that the task allocation subroutine 206b can determine which tasks are achievable under the circumstances and prepare a new task assignment list at step 420.

While the automation process 400 is illustrated as an example having a particular combination of steps, one of skill in the art would appreciate that fewer or additional steps may be implemented. In certain aspects, one or more steps may be performed in parallel. Further, one or more steps may be optional and omitted from the automation process 400, or performed separately and/or upon request from an operator. In some aspects, one or more steps may be conditional, such that execution of the one or more steps may be contingent upon predetermined requirements and/or conditions. Moreover, the order in which the steps are cycled may be rearranged depending on the needs of the operator or the system.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the disclosure may therefore be practiced otherwise than as specifically described above.

What is claimed is:

1. An autonomy system for use with a vehicle in an environment, the autonomy system comprising:
  a processor operatively coupled with a memory device;
  a plurality of sensors operatively coupled with the processor;
  a vehicle controller;
  a situational awareness circuit operatively coupled to the plurality of sensors, wherein the situational awareness circuit is configured to determine a state of the environment based at least in part on sensor data from at least one of the plurality of sensors;
  a task planning circuit communicatively coupled with the situational awareness circuit,
    wherein the task planning circuit is configured to identify, via the processor, a first plurality of tasks to be performed by the vehicle,
    wherein the task planning circuit is configured (1) to prioritize a task that would affect a mission of the vehicle and (2) to reduce priority of a task that would not affect the mission,
    wherein the task planning circuit is configured to determine periodically, as a function of the state of the environment, a likelihood of success for each of the first plurality of tasks executed in the environment by the vehicle to predict an outcome of each of the first plurality of tasks, wherein, if the likelihood of success for one or more of the first plurality of tasks is below a predetermined threshold value, the task planning circuit is configured to identify, via the processor, a second plurality of tasks to be performed by the vehicle, and wherein the task planning circuit is configured to generate, via the processor, a task assignment list from the first or second plurality of tasks that is based at least in part on predetermined optimization criteria;

a rules of engagement and constraint verification circuit coupled to the task planning circuit and configured to determine if any task of the first plurality of tasks or the second plurality of tasks violates one or more predetermined constraints; and a task execution circuit operatively coupled with the vehicle controller, wherein the task execution circuit is configured to instruct the vehicle controller to execute the first or second plurality of tasks in accordance with the task assignment list if the respective plurality of tasks does not violate the one or more predetermined constraints, wherein the task execution circuit is configured to monitor the vehicle or the vehicle controller during execution of the task assignment list to identify any errors.

2. The autonomy system of claim 1, wherein the vehicle is an aircraft and the vehicle controller is a flight controller, wherein flight controller is configured to control one or more thrust generators or one or more actuators in accordance with the task assignment list.

3. The autonomy system of claim 1, further comprising a task consensus circuit to analyze the task assignment list of the vehicle vis-à-vis a second task assignment list associated with a second vehicle that is equipped with an autonomy system, wherein the second task assignment list comprises a third plurality of tasks and wherein the task consensus circuit is configured to adjust the task assignment list based at least in part on the second task assignment list.

4. The autonomy system of claim 3, wherein the task consensus circuit is configured to adjust the task assignment list based at least in part on the second task assignment list to maximize overall efficiency of the vehicle and the second vehicle in performing a collaborative objective.

5. The autonomy system of claim 4, wherein the task consensus circuit is configured to reallocate tasks between the task assignment list and the second task assignment list.

6. The autonomy system of claim 1, wherein the predetermined optimization criteria is updated based at least in part on results from execution of the task assignment list.

7. The autonomy system of claim 4, wherein the task consensus circuit is configured to reorder said first or second plurality of tasks based at least in part on the second task assignment list or the task assignment list.

8. The autonomy system of claim 3, wherein the first or second plurality of tasks and the third plurality of tasks overlap at least in part.

9. The autonomy system of claim 8, wherein overlapping tasks are removed from either the task assignment list or the second task assignment list.

10. The autonomy system of claim 1, further comprising a human-machine interface to provide a communication interface between the autonomy system and a user.

11. The autonomy system of claim 10, wherein the human-machine interface enables a user to modify the task assignment list.

12. The autonomy system of claim 1, wherein the vehicle controller is configured to navigate the vehicle based at least in part on the task assignment list.

13. The autonomy system of claim 12, wherein the task assignment list is configured to instruct the vehicle to travel from a first location to a second location, perform an operation at the second location, and return to the first location from the second location upon completion of the operation.

14. The autonomy system of claim 1, wherein the memory device comprises an interchangeable library of code to provide autonomy, regardless of vehicle type.

15. A method of operating a vehicle having an autonomy system in an environment, the method comprising:
determining a state of the environment based at least in part on sensor data from at least one of a plurality of sensors coupled to the vehicle;
identifying, via a processor, a first plurality of tasks to be performed by the vehicle;
periodically determining, as a function of the state of the environment, a likelihood of success for each of the first plurality of tasks executed in the environment by the vehicle to predict an outcome of each of the first plurality of tasks;
if the likelihood of success for one or more of the first plurality of tasks is below a predetermined threshold value, identifying, via the processor, a second plurality of tasks to be performed by the vehicle, wherein the predetermined threshold value reflects a likelihood that a deployable object will reach a target based on its release at an altitude, a heading, or a vehicle speed;
generating, via the processor, a task assignment list from the first or second plurality of tasks that is based at least in part on predetermined optimization criteria;
determining, via the processor, if any task of the first plurality of tasks or the second plurality of tasks violates one or more predetermined constraints;
instructing a vehicle controller of the vehicle to execute the first or second plurality of tasks in accordance with the task assignment list if the respective plurality of tasks does not violate the one or more predetermined constraints; and
monitoring the vehicle or the vehicle controller during execution of the task assignment list to identify any errors.

16. The method of claim 15, wherein the vehicle is an aircraft and the vehicle controller is a flight controller, wherein flight controller is configured to control one or more thrust generators or one or more actuators in accordance with the task assignment list.

17. The method of claim 15, further comprising the steps of: analyzing the task assignment list of the vehicle vis-à-vis a second task assignment list associated with a second vehicle that is equipped with an autonomy system, wherein the second task assignment list comprises a third plurality of tasks; and adjusting the task assignment list based at least in part on a second task assignment list.

18. The method of claim 17, further comprising the step of adjusting the task assignment list based at least in part on the second task assignment list to maximize overall efficiency of the vehicle and the second vehicle in performing a collaborative objective.

19. The method of claim 15, further comprising the step of modifying the task assignment list based at least in part on an input from a user via a human-machine interface.

20. The method of claim 15, wherein the vehicle controller is configured to navigate the vehicle based at least in part on the task assignment list.

21. The method of claim 20, wherein the task assignment list is configured to instruct the vehicle to travel from a first location to a second location, perform an operation at the second location, and return to the first location from the second location upon completion of the operation.

22. An autonomous aircraft for operation in an environment, the autonomous aircraft comprising:
a processor operatively coupled with a memory device;
a plurality of sensors operatively coupled with the processor;
a flight controller;
a situational awareness circuit operatively coupled to the plurality of sensors, wherein the situational awareness circuit is configured to determine a state of the environment based at least in part on sensor data from at least one of the plurality of sensors and to identify one or more threats to autonomous aircraft in the environment,
wherein the task planning circuit is configured (1) to prioritize a task that would affect a mission of the vehicle and (2) to reduce priority of a task that would not affect the mission;
a task planning circuit communicatively coupled with the situational awareness circuit,
wherein the task planning circuit is configured to identify, via the processor, a first plurality of tasks to be performed by the autonomous aircraft,
wherein the task planning circuit is configured to determine periodically, as a function of the state of the environment, a likelihood of success for each of the first plurality of tasks executed in the environment by the autonomous aircraft to predict an outcome of each of the first plurality of tasks,
wherein, if the likelihood of success for one or more of the first plurality of tasks is below a predetermined threshold value, the task planning circuit is configured to identify, via the processor, a second plurality of tasks to be performed by the autonomous aircraft,
wherein the task planning circuit is configured to generate, via the processor, a task assignment list from the first or second plurality of tasks that is based at least in part on predetermined optimization criteria, and
wherein the task planning circuit is configured to prioritize a task as a function of the one or more threats;
a rules of engagement and constraint verification circuit coupled to the task planning circuit and configured to determine if any task of the first plurality of tasks or the second plurality of tasks violates one or more predetermined constraints; and
a task execution circuit operatively coupled with the flight controller, wherein the task execution circuit is configured to instruct the flight controller to execute the first or second plurality of tasks in accordance with the task assignment list if the respective plurality of tasks does not violate the one or more predetermined constraints, wherein the task execution circuit is configured to monitor the flight controller during execution of the task assignment list to identify any errors.

23. The autonomous aircraft of claim 22, wherein, upon executing the task assignment list, the autonomous aircraft to travel from a first location to a second location, perform an operation at the second location, and return to the first location from the second location upon completion of the operation.

* * * * *